(12) United States Patent
Barzelay (10) Patent No.: US 11,453,104 B2
(45) Date of Patent: Sep. 27, 2022

(54) TORQUE WRENCH HAVING SELF-ADJUSTING ADAPTER

(71) Applicant: TYM LABS L.L.C., Saddle Brooke, NJ (US)

(72) Inventor: Abraham Barzelay, Paramus, NJ (US)

(73) Assignee: TYM LABS L.L.C., Saddle Brooke, NJ (US)

( * ) Notice: Subject to any disclaimer, the term of this patent is extended or adjusted under 35 U.S.C. 154(b) by 712 days.

(21) Appl. No.: 15/488,097

(22) Filed: Apr. 14, 2017

(65) Prior Publication Data
US 2018/0297181 A1  Oct. 18, 2018

(51) Int. Cl.
*B25B 19/00* (2006.01)
*B25B 13/18* (2006.01)
*B23P 19/06* (2006.01)

(52) U.S. Cl.
CPC .............. *B25B 19/00* (2013.01); *B25B 13/18* (2013.01); *B23P 19/06* (2013.01)

(58) Field of Classification Search
CPC ....... B25B 23/108; B25B 19/00; B25B 17/00; B25B 13/467; B25B 13/481; B25B 23/12; B25B 23/18; B25B 23/44; B25B 23/46; B25B 23/5041; B23P 19/06
USPC .......................................................... 81/128
See application file for complete search history.

(56) References Cited

U.S. PATENT DOCUMENTS

| | | | |
|---|---|---|---|
| 1,970,721 A * | 8/1934 | Walton .................. | B25B 13/467 74/142 |
| 2,477,528 A * | 7/1949 | Shrader .................. | B25B 15/00 475/270 |
| 2,756,792 A * | 7/1956 | Hirschman ............. | B25B 17/02 74/421 R |
| 2,764,050 A * | 9/1956 | Leibowitz ............... | B25B 13/44 81/90.2 |
| 2,884,826 A | 5/1959 | Bruhn | |
| 3,373,639 A * | 3/1968 | Dalen ..................... | B25B 13/00 81/112 |
| 3,724,299 A | 4/1973 | Nelson | |
| 3,979,965 A * | 9/1976 | Vuceta .................... | B25B 17/02 74/410 |
| 4,043,228 A * | 8/1977 | Venezio .................. | B25B 17/00 81/57.3 |
| 4,911,040 A * | 3/1990 | Kim ........................ | B25B 13/00 81/128 |
| 5,123,310 A | 6/1992 | McManus | |
| 5,213,015 A * | 5/1993 | Disston, Jr. ............. | B25B 15/02 81/90.9 |
| 5,305,670 A | 4/1994 | Fossella | |

(Continued)

OTHER PUBLICATIONS

New U.S. Application to Abraham Barzelay et al. entitled "Torque Wrench Having Self-Adjusting Adapter" filed on Apr. 14, 2017.

(Continued)

*Primary Examiner* — Seahee Hong (57) ABSTRACT

A torque wrench is disclosed for use in rotating a range of different sized fasteners. The torque wrench may include an input end configured to receive a torsional input, and a gear train operatively driven to rotate by the torsional input. The torque wrench may also include an adjustable adapter connected to the gear train at an output end and configured to adjustably engage the range of different sized fasteners, and a housing configured to enclose the gear train and the adjustable adapter.

18 Claims, 5 Drawing Sheets

(56) References Cited

U.S. PATENT DOCUMENTS

| | | | | |
|---|---|---|---|---|
| 5,375,489 A | * | 12/1994 | McClure | B25B 13/44 81/128 |
| 5,448,931 A | * | 9/1995 | Fossella | B25B 13/44 81/128 |
| 5,501,107 A | * | 3/1996 | Snyder | B25B 17/00 73/862.23 |
| 5,918,511 A | | 7/1999 | Sabbaghian | |
| 5,996,446 A | * | 12/1999 | Lee | B25B 13/44 279/114 |
| 6,073,522 A | | 6/2000 | Carnesi | |
| 6,202,516 B1 | | 3/2001 | Kim | |
| 6,715,380 B2 | | 4/2004 | Listl | |
| 7,062,996 B2 | * | 6/2006 | Johnson | B25B 13/44 81/157 |
| 7,318,365 B2 | * | 1/2008 | Huang | B25B 13/06 81/128 |
| 7,478,577 B1 | | 1/2009 | Wheeler | |
| 7,530,253 B2 | | 5/2009 | Spenser | |
| 8,695,462 B1 | | 4/2014 | Jorgensen | |
| 8,893,592 B2 | | 11/2014 | Womack | |
| 9,583,904 B2 | | 2/2017 | Battenfeld | |
| 9,757,232 B2 | | 9/2017 | Peterson | |
| 10,427,280 B2 | * | 10/2019 | Zelniker | B25B 13/18 |
| 2002/0096020 A1 | * | 7/2002 | Hart | B25B 13/488 81/57.14 |
| 2005/0183548 A1 | | 8/2005 | Horobec | |
| 2006/0107798 A1 | * | 5/2006 | Falzone | B25B 13/46 81/57.3 |
| 2006/0283265 A1 | | 12/2006 | Izumisawa | |
| 2007/0251359 A1 | | 11/2007 | Junkers | |
| 2008/0223179 A1 | * | 9/2008 | Nash | B25B 13/463 81/61 |
| 2008/0282846 A1 | * | 11/2008 | Sharifi-Mehr | B25B 17/02 81/57 |
| 2009/0309282 A1 | | 12/2009 | Wang | |
| 2011/0056337 A1 | | 3/2011 | Buchanan | |
| 2012/0103142 A1 | | 5/2012 | Sroka | |
| 2014/0053693 A1 | | 2/2014 | Womack | |
| 2014/0096653 A1 | * | 4/2014 | Pirseyedi | B25B 13/12 81/60 |
| 2018/0015593 A1 | | 1/2018 | Wang | |
| 2018/0043515 A1 | | 2/2018 | Zelniker | |

OTHER PUBLICATIONS

International Search Report and Written Opinion in Application No. PCT/US18/027243 dated Jun. 15, 2018 (5 pages).

* cited by examiner

TORQUE WRENCH HAVING SELF-ADJUSTING ADAPTER

TECHNICAL FIELD

The present disclosure is directed to a torque wrench and, more particularly, to a torque wrench having a self-adjusting adapter.

BACKGROUND

A torque wrench is a tool designed to exert torque on a fastener (e.g., on a bolt head or nut having specially designed inner and/or outer surfaces) to loosen or tighten the fastener. In some embodiments, the torque wrench is powered. For example, the torque wrench can be hydraulically, pneumatically, or electrically powered. In other examples, the torque wrench is manually manipulated.

Conventional torque wrenches connect to the fastener via an adapter. For example, a hexagonal socket having an internal diameter corresponding to an external diameter of the fastener is temporarily connected to the torque wrench and then placed over the fastener. The hexagonal socket is configured to internally receive the head of the fastener and inhibit relative movement of the fastener during the application of torque by the wrench. Sockets are available in many different sizes to accommodate different sizes of fasteners.

Although conventional torque wrenches and socket-type adapters may be acceptable for some applications, they can also be problematic. For example, in order to be capable of accomplishing any task presented in the field, a technician may be required to carry around a large assortment of sockets of different sizes. This can be burdensome for the technician and expensive to stock and maintain. In addition, it can be difficult to immediately match the correct socket to a given fastener, leading to a delay in removing or installing the fastener. And each time a new fastener is encountered, a new socket may be required to address the new fastener.

The torque wrench and adapter of the present disclosure solves one or more of the problems set forth above and/or other problems of the prior art.

SUMMARY

One aspect of the present disclosure is directed to a torque wrench. The torque wrench may include an input end configured to receive a torsional input, and a gear train operatively driven to rotate by the torsional input. The torque wrench may also include an adjustable adapter connected to the gear train at an output end and configured to adjustably engage a range of different sized fasteners, and a housing configured to enclose the gear train and the adjustable adapter.

Another aspect of the present disclosure is directed to an adjustable adapter module for use with a torque wrench. The adjustable adapter module may include a driver configured to receive a rotational input from the torque wrench. The adjustable adapter module may also include a plurality of clamps disposed at least partially inside the driver and moveable by rotation of the driver to radially engage and lock onto a range of different sized fasteners.

Another aspect of the present disclosure is directed to a torque assembly. The torque assembly may include a wrench, an adjustable adapter module, and a retention assembly configured to retain the adjustable adapter module connected to the wrench. The adjustable adapter module may include a driver configured to transmit a rotational input received from the wrench to a plurality of integral lobes. Each of the plurality of integral lobes may have a leading end, a trailing end located radially closer to an axis of rotation than the leading end, and a curved surface connecting the leading and trailing ends. The adjustable adapter module may further include a plurality of clamps disposed at least partially inside the driver and engaged with the curved surfaces of the plurality of integral lobes. The plurality of clamps may be moveable by rotation of the driver to radially engage and lock onto a range of different sized fasteners. The adjustable adapter module may additionally include a plurality of springs configured to bias the plurality of clamps away from the different sized fasteners, and a guide having a plurality of radially oriented channels configured to guide the plurality of clamps into engagement with the different sized fasteners.

DETAILED DESCRIPTION

Figure 1:
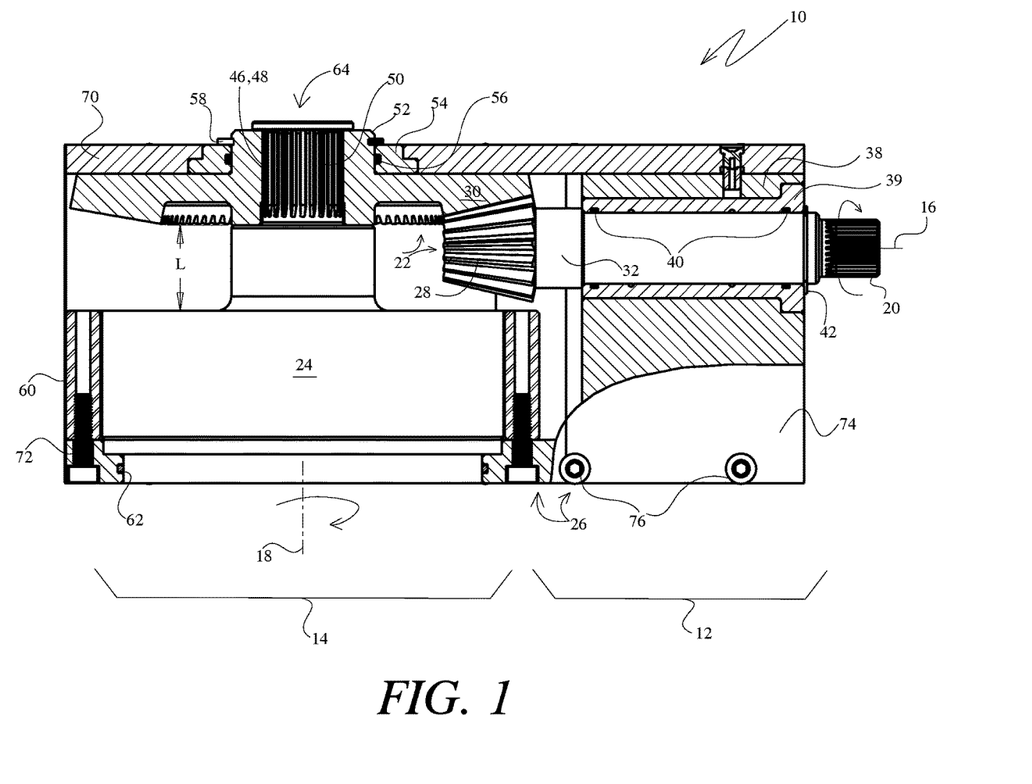
FIG. 1 is an cross-sectional illustration of an exemplary disclosed torque wrench.
Figure 4:
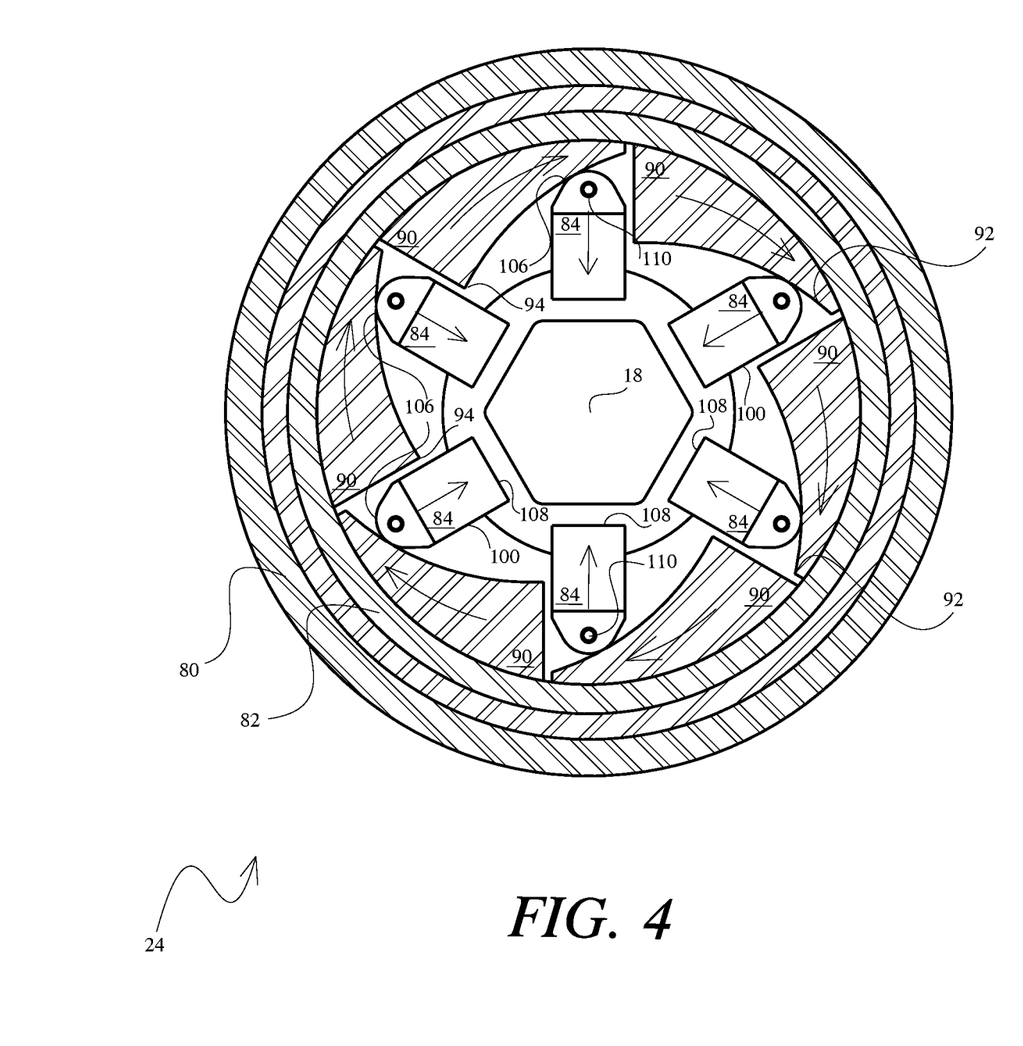
FIG. 4 is a cross-sectional illustration of the adjustable adapter of FIG. 3.

FIG. 1 illustrates an exemplary torque wrench ("wrench") 10 that can be used to loosen or tighten a fastener (e.g., a bolt having a head with internal and/or external engagement features—shown only in FIG. 4). Wrench 10 may generally be divided into an input end 12 and an output end 14. Input end 12 may be configured to receive a torsional input (e.g., from a manually operated lever or from an electric, hydraulic, or pneumatic motor), which is then transformed into a torsional output at output end 14. The torsional input may be generally aligned with a first axis 16 of wrench 10, while the torsional output may be generally aligned with a second axis 18 that is substantially (e.g., within 0-10°) orthogonal to first axis 16. Input end 12 may include an engagement interface (e.g., a socket; a splined, torx, or square stub shaft; etc.) 20 configured to mate with a corresponding engagement interface of the lever or motor and receive the torsional input.

In one embodiment, input end 12 of wrench 10 may not mate directly with the lever or motor described above. Instead, an optional engagement unit (not shown) may be disposed between wrench 10 and the lever or motor. The engagement unit may be configured to selectively create a mechanical coupling between input end 12 and the lever or motor, for example based on a speed, pressure, flow rate, power, and/or other parameter associated with wrench 10 and/or the lever or motor. In one embodiment, the mechanical coupling of the engagement unit could be selectively interrupted, such that a hammering effect is created within wrench 10 that helps to loosen and/or tighten a corresponding fastener.

Figure 2:
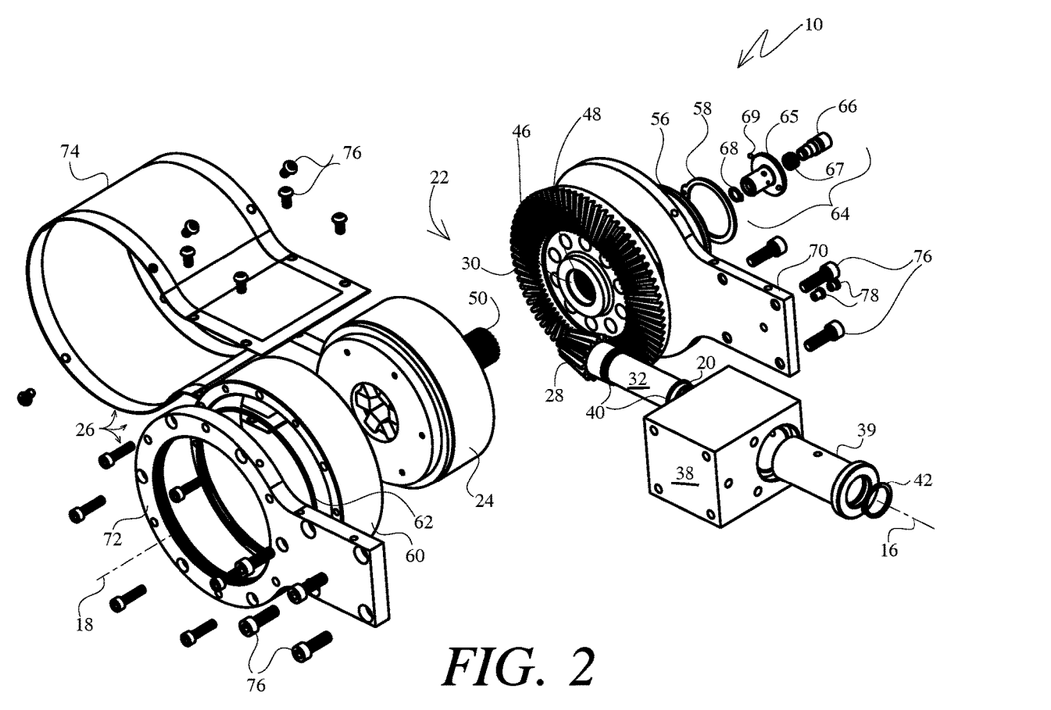
FIG. 2 is an exploded view illustration of the torque wrench of FIG. 1.

As shown in FIGS. 1 and 2, wrench 10 may be assembly of multiple different components that cooperate to transfer torque received at input end 12 to output end 14. These components may include, among other things, a gear train 22, an adjustable adapter 24, a housing 26 configured to support and enclose gear train 22 and adjustable adapter 24, and a variety of hardware that retains and seals gear train 22 and adjustable adapter 24 within housing 26.

Gear train 22 may include a pinion gear 28 and a crown gear 30. Pinion gear 28 may be formed at an end of a shaft 32 that extends to engagement interface 20, and may include a plurality of teeth that engage and drive corresponding teeth of crown gear 30. In the disclosed embodiment, the teeth of pinion gear 28 and crown gear 30 are beveled, such that pinion gear 28 may rotate about axis 16 while crown gear 30 rotates about axis 18. It is contemplated that the teeth of these gears could be straight and have a conical pitch (e.g., pinion gear 28 could be a straight bevel gear), curved and have a conical pitch (e.g., pinion gear 28 could be a spiral bevel gear), or curved and have a hypoid pitch (e.g., pinion gear 28 could be a hypoid bevel gear), as desired.

Pinion gear 28 may be supported within housing 26 by way of a bearing block 38. For example, a bearing (e.g., bushing, needle bearing, roller bearing, etc.) 39 may be disposed within bearing block 38 and configured to slidingly receive shaft 32 in an axial direction and to support rotation of shaft 32. One or more seals (e.g., o-rings or gaskets) 40 and/or retainers (e.g., circlips, snaprings, etc.) 42 may be used to seal and/or retain bearing 39 and/or shaft 32 in place within housing 26.

Crown gear 30 may have teeth extending toward an outer annular periphery, and include a central opening 46 with engagement features (e.g., internal splines, cogs, gear teeth, etc.) 48 formed therein. Features 48 may be configured to engage corresponding features 50 of adjustable adapter 24. A shoulder 52 may surround opening 46 at a back (i.e., non-toothed) side of crown gear 30 and function to position and support rotation of crown gear 30 within housing 26. A bushing 54 may be placed against the back side of crown gear 30 and around shoulder 52, and include a step that passes through a corresponding opening within housing 26. A seal (e.g., o-rings or gaskets) 56 may be annularly sandwiched between bushing 54 and shoulder 52, and a retainer (e.g., a circlip, snapring, etc.) 58 may engage a corresponding groove in shoulder 52 to retain crown gear 30 in place.

A bushing 60 may be placed around adjustable adapter 24 at an opposite side of wrench 10, and a seal (e.g., o-rings or gaskets) 62 may be annularly sandwiched between housing 26 and adjustable adapter 24. In the example of FIG. 1, adjustable adapter 24 may have an axial length L sufficient to provide internal clearance for bushing 60 around pinion gear 28 inside of housing 26. In particular, in this example, adjustable adapter 24 may function at least partially as a spacer that maintains a desired distance between bushing 60 and pinion gear 28.

A retaining sub-assembly ("sub-assembly") 64 may be used, in some embodiments, at the closed or non-accessible side of wrench 10 to retain connection between adjustable adapter 24 and crown gear 30. As shown in FIG. 2, sub-assembly 64 may include, among other things, a locking housing ("housing") 65, a pin 66, a spring 67, a clip 68, and one or more balls 69. Housing 65 may be generally cylindrical and hollow, having a shaft that is received within adjustable adapter 24, and an annular flange located at an exposed end that rests against shoulder 52 of crown gear 30. Pin 66 may pass a distance through the shaft of housing 65, and clip 68 may engage the protruding end to inhibit separation of pin 66 from housing 65. Spring 67 may be trapped inside of the shaft of housing 65, between an internal lip of the shaft of housing 65 and an external shoulder of pin 66. In this configuration, pin 66 may be pushed downward against a bias of spring 67, and the bias may urge pin 66 out of housing 65. However, pin 66 may not leave housing 65 due to the connection with clip 68. Balls 69 may rest in pockets co-formed by external recesses of pin 66 and internal recesses of housing 65. When sub-assembly 64 is placed into an exposed end of adjustable adapter 24, balls 69 may be pushed outward and into engagement with corresponding recesses inside adjustable adapter 24, such that a mechanical interference is created between balls 69, internal walls of adjustable adapter 24, and walls of housing 65.

Housing 26 of wrench 10 may also be an assembly of multiple components. The components of housing 26 may include among other things, first and second plates 70, 72 oriented in opposition to each other, and a shroud 74 that wraps around edges of plates 70, 72 to surround and enclose adjustable adapter 24 and gear train 22. Each of plates 70, 72 may be generally rectangular at input end 12 to match a size and shape of bearing block 38, and generally rounded and concentric with crown gear 30 at output end 14. The openings through which bushing 52 and adjustable adapter 24 pass may be located at a general center of the rounded portions of plates 70, 72. Any number of fasteners 76 may be used to connect shroud 74 to the edges of plates 70, 72 and/or to connect plates 70, 72 to bearing block 38.

In one embodiment, wrench 10 may be sealed from the environment at an elevated or positive pressure. For example, one or more fittings (e.g., one-way valves) 78 may be connected to housing 26 (e.g., to one or more both of plates 70, 72) and configured to admit a lubricant (e.g., grease) into housing 26 without allowing escape of the lubricant. The lubricant may be pressurized, such that external contaminates (e.g., water, air, debris, etc.) do not enter housing 26. This may allow wrench 10 to be operated in harsh conditions (e.g., under water or in contaminated environments) without undue effects. The sealed nature of wrench 10, combined with an inherent low rotational speed and temperature, may also reduce maintenance requirements. In particular, the grease may be retained inside wrench 10 for a life of wrench 10 without significant degradation (e.g., because of the clean and cool environment inside of sealed housing 26).

Figure 3:
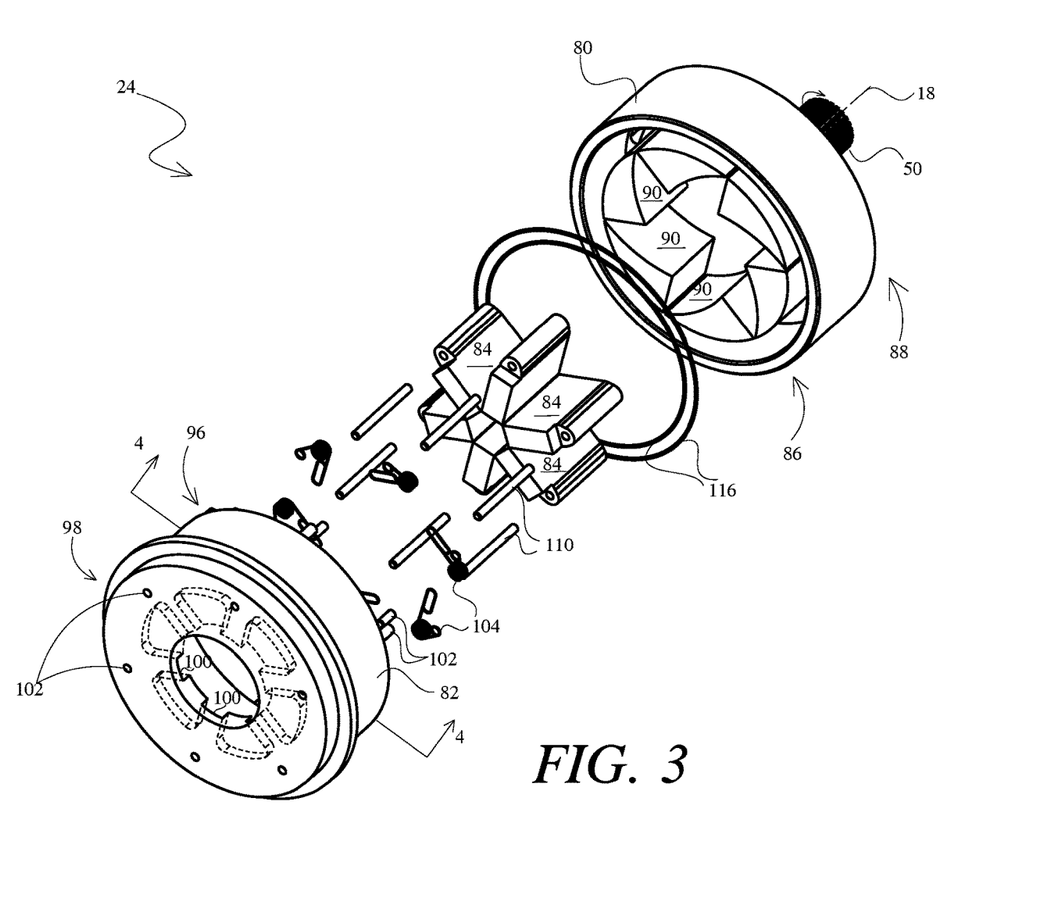
FIG. 3 is an exploded view illustration of an exemplary adjustable adapter that may form a portion of the torque wrench of FIGS. 1 and 2.

FIGS. 3 and 4 illustrate an exemplary embodiment of adjustable adapter 24. As shown in these figures, adjustable adapter 24 may be an assembly of components that function to engage and rotate an associated fastener, as crown gear 30 (referring to FIGS. 1 and 2) is rotated inside of wrench 10. These components may include, among other things, a driver 80, a guide 82, and a plurality of clamps 84 that are moved by driver 80 into guided contact with the head of the fastener.

Driver 80 may be generally cylindrical and hollow, having an open end 86 and an opposing closed end 88. Features 50 of driver 80, which are described above as engaging features 48 of crown gear 30 (referring to FIGS. 1 and 2), may protrude in a normal direction from an outer axial surface at closed end 88. A plurality of (e.g., six) arcuate lobes or inclined wedges 90 may extend from an inner axial surface of driver 80 toward open end 86. As shown in FIG. 4, lobes 90 may be equally distributed around an inner periphery of driver 80, and each may include a leading end 92 located radially further from axis 18 and a trailing end 94 located radially closer to axis 18. A smooth inner annular surface may connect leading end 92 to trailing end 94. With this configuration, a rotation of crown gear 30 (referring to FIGS. 1 and 2) may result in a corresponding rotation of driver 80 and lobes 90. It should be noted that a radial offset between leading and trailing ends 92, 94, as well as an arc-length of the surface connecting these features, may be adjustable and tailored to accommodate a specific size-range of fasteners accepted by adjustable adapter 24 and/or a speed of fastener engagement that may be needed for specific applications.

In some embodiments, lobes 90 may be integrally formed with driver 80 (e.g., cast, forged, and/or machined as a monolithic structure) from the same material. This may be a low-cost way to fabricate driver 80 and lobes 90. However, in other embodiments, lobes 90 may be fabricated separately from the same or different material. Separate fabrication could allow for simple replacement of worn lobes 90, reorientation of lobes 90, and/or lobes made from a specialized material (e.g., from a harder and/or low-friction material).

Guide 82 may also be generally cylindrical and hollow, having a first open end 96 and an opposing second open end 98. An opening at first end 96 may be larger than an opening at second end 98. First end 96 may be received within driver 80 (e.g., within an annular space located radially outward of lobes 90). Second end 98 may be configured to receive the associated fastener that is to be loosened or tightened. A plurality of radially oriented channels 100 may be distributed around an inner axial surface of guide 82 and extend radially from an inner periphery of guide 82 to the opening at second end 98. Each channel 100 may have a width sufficient to slidingly receive a corresponding clamp 84.

A post 102 may be mounted to guide 82 at an outer end of each channel 100, and a biasing element (e.g., a spring) 104 may engage post 102. As will be described in more detail below, spring 104 may bias the corresponding clamp 84 radially outward and away from the head of the fastener.

Clamp 84 be a generally elongated cuboid configured to slide with channel 100 of guide 82 when moved by lobe 90 of driver 80. Each clamp 84 may include a generally rounded surface 106 at an outer-most end, and a generally flat surface 108 at an inner-most end. Surface 106 may ride on the arcuate inner annular surface of lobe 90, while surface 108 may engage a corresponding flat land of the bolt head. With this configuration, as driver 80 is rotated by crown gear 30 (referring to FIGS. 1 and 2), lobe 90 may move from engagement with surface 106 at leading end 92 to engagement with surface 106 at trailing end 94. This operation, due to the radial offset between leading and trailing ends 92, 94, may force clamp 84 to slide radially inward within channel 100 of guide 82 until surface 108 engages the flat land of the bolt head. A post 110 may be mounted to each clamp 84 adjacent surface 106, and spring 104 may engage post 110, such that spring 104 pulls clamp 84 back radially outward as lobe 90 is rotated away from clamp 84 (i.e., from trailing end 94 back to leading end 92). In some embodiments, clamp 84 may be recessed at post 110 (e.g., at a surface of clamp 84 adjacent the inner axial surface of guide 82) to provide clearance for post 110 and/or spring 104.

In some embodiments, adjustable adapter 24 may itself be sealed from its environment and/or from the rest of wrench 10 in the same manner described above regarding wrench 10. For example, a seal 116 may be disposed between driver 80 and guide 82. Lubricant may be pressurized inside of adjustable adapter, such that external contaminates (e.g., water, air, debris, etc.) do not enter adjustable adapter 24. This may allow adjustable adapter 24 to be removed from wrench 10, reoriented, and/or used with a different wrench 10 without undue effects caused by external contamination.

Figure 5:
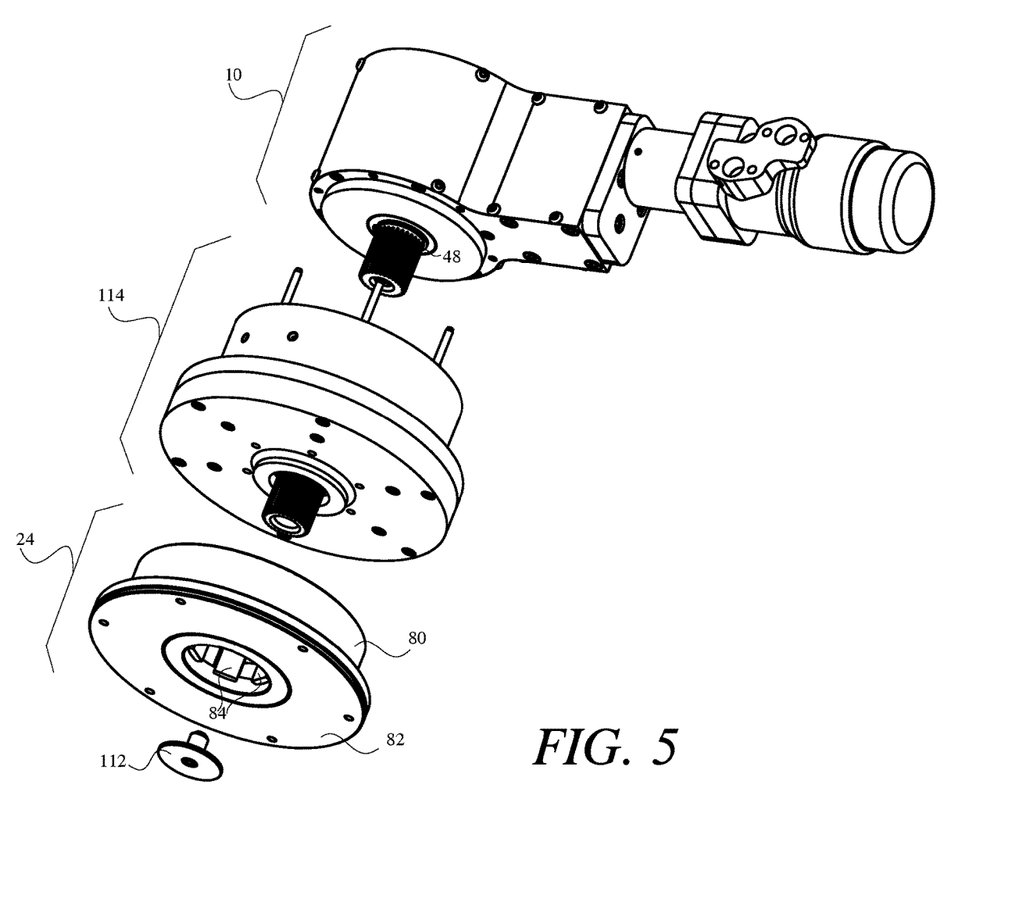
FIG. 5 is an exploded view illustration of an exemplary torque assembly having an adjustable adapter module and a torque wrench.

FIG. 5 illustrates an alternative embodiment of wrench 10 and adjustable adapter 24. In this embodiment, adjustable adapter 24 may be a separate and stand-alone module that can be selectively used with wrench 10 or with another tool (e.g., a manual wrench or lever—not shown). Like the previously described embodiment, adjustable adapter 24 of FIG. 5 may include driver 80, guide 82, clamps 84, posts 102, springs 104, and posts 110. However, in the embodiment of FIG. 5, bushing 60 may not be required; guide 82 may not be mounted within plate 70 of wrench housing 26; and features 48 of crown gear 30 may be male and protrude into closed end 88 of driver 80 to engage corresponding female features (not shown). In addition, an optional retention assembly 112 (e.g., an assembly substantially identical to retention assembly 64 described above) may be used to retain connection between wrench 10 and adjustable adapter 24).

In some embodiments, wrench 10 and adjustable adapter 24 may be used with another module, if desired. For example, one or more torque multiplier modules 114 may be disposed between wrench 10 and adjustable adapter 24. Torque multiplier module 114 may be configured to receive a torque input from wrench 10, increase the torque, and provide the increased torque to adjustable adapter 24. In this embodiment, the various modules may be stacked on top of each other, and one or more retention assemblies 112 may be used to hold the stack together.

INDUSTRIAL APPLICABILITY

The torque wrench and adjustable adapter of the present disclosure have wide application in many different industries. The disclosed torque wrench and adjustable adapter may be used anywhere that a range of different-sized fasteners are to be loosened or tightened with high-levels of torque and/or at high speed without having to use multiple different adapters. For example, the disclosed torque wrench and adjustable adapter may be used in the oil and gas industry to join segments of a pipeline together. Operation of wrench 10 and adjustable adapter 24 will now be described with reference to FIGS. 1 and 4.

To loosen and/or tighten a fastener, the opening of guide 82 at end 98 may be placed over the head of the fastener. Driver 80 should already be rotated to its starting position prior to placement over the fastener, such that the arcuate inner annular surfaces of lobes 90 are engaged with clamps 84 at leading end 92 (shown in FIG. 4). This may help ensure that clamps 84 are pulled by springs 104 within channels 100 to their furtherst apart positions. Adjustable adapter 24 should be capable of receiving a largest fastener within its operational range at this time.

If adjustable adapter 24 is internal to wrench 10, torque may now be applied to input end 12 of wrench 10. If adjustable adapter 24 is a separate and stand-alone module, adjustable adapter 24 may be connected to wrench 10 via retention assembly 112, after which the torque may be applied to input end 12 of wrench 10. It is also contemplated that adjustable adapter 24 may first be connected to wrench 10, and then placed over the fastener head, if desired. The applied torque may cause pinion gear 28 to rotate about axis 16 and generate a corresponding rotation of crown gear 30 about axis 18 (referring to FIG. 1). The rotation of crown gear 30 may be transmitted to driver 80 via features 48 and 50. As driver 80 is rotated, lobes 90 may also be caused to rotate such that the arcuate inner annular surfaces slide along the corresponding curved surfaces 106 of clamps 84 toward the trailing end 94. Due to the radial offset between leading end 92 and trailing end 94, clamps 84 may be caused to slide radially inward within channels 100 until end surfaces 108 engage corresponding flat lands of the bolt head. The bolt head may become locked within adjustable adapter 24 at this point in time.

After the bolt head becomes locked within adjustable adapter 24, additional torque applied to wrench 10 may be transmitted through driver 80, lobes 90, and clamps 84 to the fastener. Depending on the orientation of lobes 90 within driver 80 and the direction of the torque, the torque may result in a corresponding loosening or tightening of the fastener. To achieve an opposite effect, an adjustable adapter 24 having an opposite orientation of lobes 90 may be required. It is contemplated that adjustable adapters 24 may be dedicated to only loosening or to only tightening. Alternatively, it is contemplated that lobes 90 may be removable from adjustable adapter 24, such that they can be reoriented in a desired manner to achieve desired loosening or tightening.

After the fastener has been loosened or tightened, the torque applied to wrench 10 may be reversed. This reversal may cause pinion gear 28 to rotate about axis 16 in an opposite direction and generate a corresponding opposite rotation of crown gear 30 about axis 18 (referring to FIG. 1). The opposite rotation of crown gear 30 may be transmitted to driver 80 via features 48 and 50. As driver 80 is rotated in the opposite direction, lobes 90 may also be caused to rotate in the opposite direction such that the arcuate inner annular surfaces slide along the corresponding curved surfaces 106 of clamps 84 toward the leading end 94. Due to the radial offset between leading end 92 and trailing end 94, clamps 84 may be allowed to slide radially outward within channels 100 under the bias of springs 104, allowing surfaces 108 to move away from the corresponding flat lands of the bolt head. The bolt head may become unlocked within adjustable adapter 24 at this point in time, and adjustable adapter 24 and wrench 10 may be removed from the fastener.

The disclosed torque wrench and adjustable adapter may be versatile. Specifically, the disclosed torque wrench, via the adjustable adapter, may be used to loosen and/or tighten any fastener within its given size range. This may allow for a technician to address a greater variety of situations with a reduced amount of equipment. The increased capacity may increase profit and efficiency, while the reduced amount of equipment may reduce owning and operating costs.

The disclosed torque wrench and adjustable adapter may be capable of reliably producing high-levels of torque. In particular, the disclosed gear train inside of the wrench may allow for efficient torque transmission with little or no backlash.

Finally, the disclosed torque wrench and adjustable adapter may be simple and low-cost to maintain. In particular, because the disclosed torque wrench and adjustable adapter may be sealed and pressurized, these tools may not need to be opened, cleaned, and/or lubricated frequently. In addition, the sealed and pressurized nature of the disclosed torque wrench and adjustable adapter may allow for usage in locations and/or conditions (e.g., underwater and/or in contaminated environments) not heretofore possible.

It will be apparent to those skilled in the art that various modifications and variations can be made to the torque wrench and adjustable adapter of the present disclosure without departing from the scope of the disclosure. Other embodiments will be apparent to those skilled in the art from consideration of the specification and practice of the torque wrench and adjustable adapter disclosed herein. It is intended that the specification and examples be considered as exemplary only, with a true scope of the disclosure being indicated by the following claims and their equivalents.

What is claimed is:

1. A torque wrench, comprising:
    an input end configured to receive a torsional input;
    an output end configured to deliver a torsional output; and
    a self-adjustable adapter at the output end, the self-adjustable adapter comprising:
        at least one clamp, the at least one clamp having a driver contacting surface at one end and a fastener contacting surface at another end;
        a driver having at least one sloped clamp contacting surface, and
        a guide having an open central region configured to receive a fastener, the guide also having at least one radially oriented channel extending radially outward from and in radial alignment with the open central region, the at least one radially oriented channel configured to slidingly receive the at least one clamp,
    wherein the at least one sloped clamp contacting surface of the driver engages the driver contacting surface of the at least one clamp to move the at least one clamp radially within the at least one radially oriented channel, wherein the at least one radially oriented channel is in radial alignment with the fastener received within the open central region so as to guide the at least one clamp toward the fastener received in the open central region, and wherein the self-adjustable adapter adjusts in size in response to the torsional input so that the self-adjustable adapter can engage a range of different sized fasteners that are receivable within the open central region.

2. The torque wrench of claim 1, further comprising a gear train operatively driven to rotate by the torsional input and wherein the self-adjustable adapter is adapted to automatically engage and lock onto each of the different sized fasteners during rotation of the gear train.

3. The torque wrench of claim 2, wherein the gear train and the self-adjustable adapter are sealed inside a housing from a surrounding environment at a positive pressure.

4. The torque wrench of claim 1, wherein the at least one clamp is a plurality of clamps and wherein each clamp is moveable by rotation of the driver.

5. The torque wrench of claim 1, further comprising a spring that biases the clamp radially outward and away from the different sized fasteners.

6. The torque wrench of claim 1, wherein the driver comprises at least one lobe, the lobe having a leading end located radially further from an axis of rotation than a trailing end.

7. The torque wrench of claim 6, wherein the at least one lobe includes the at least one sloped clamp contacting surface which connects the leading and trailing ends.

8. The torque wrench of claim 7, wherein the at least one sloped clamp contacting surface is curved.

9. The torque wrench of claim 6, wherein an open end of the guide is received within the driver radially outward from the at least one lobe.

10. The torque wrench of claim 6, wherein the at least one lobe is a plurality of lobes and wherein each lobe comprises a leading end and a trailing end.

11. The torque wrench of claim 1, wherein:
    the torsional input that is received by the input end is aligned with a first axis of the torque wrench; and the torsional output that is delivered by the output end is aligned with a second axis of the torque wrench that is substantially orthogonal to the first axis.

12. The torque wrench of claim 1, wherein the at least one sloped clamp contacting surface is an inclined surface.

13. The torque wrench of claim 1, wherein the at least one sloped clamp contacting surface is an arcuate surface.

14. A self-adjustable adapter module for use with a torque wrench, the self-adjustable adapter module comprising:
  a driver configured to receive a rotational input from the torque wrench;
  a plurality of clamps each disposed at least partially inside the driver and each radially moveable in response to rotation of the driver, and
  a guide having a plurality of radially-oriented channels, each of the plurality of radially-oriented channels being configured to guide a corresponding one of the plurality of clamps, and each of the plurality of radially-oriented channels being in radial alignment with an open central region of the guide,
  wherein the self-adjustable adapter module adjusts in size in response to the rotational input from the torque wrench so that the self-adjusting adapter module can engage a range of different sized fasteners that are received within the open central region of the guide, and
  wherein the driver includes a plurality of lobes, each lobe having:
    a leading end located radially further from an axis of rotation than a trailing end; and
    a surface connecting the leading and trailing ends, the surface being configured to engage a corresponding surface of the at least one clamp at an end opposite where the at least one clamp is adapted to engage the different sized fasteners.

15. The self-adjustable adapter module of claim 14, wherein the self-adjustable adapter module comprises a plurality of springs, each corresponding to one of the plurality of clamps and biasing the corresponding one of the plurality of clamps radially outward and away from the different sized fasteners.

16. The self-adjustable adapter module of claim 14, wherein the surface connecting the leading and trailing ends of each lobe is a curved surface.

17. A torque assembly comprising:
  a wrench;
  an adjustable adapter module, including:
    a driver configured to transmit a rotational input received from the wrench to at least one lobe having:
      a leading end;
      a trailing end located radially closer to an axis of rotation than the leading end; and
      a surface connecting the leading end and trailing end;
    at least one clamp disposed at least partially inside the driver and engaged with the surface of the at least one lobe, the at least one clamp being radially moveable in response to rotation of the driver, wherein the adjustable adapter module adjusts in size in response to the rotational input received from the wrench so that the adjustable adapter module can engage a range of different sized fasteners; and
    at least one spring configured to bias the at least one clamp radially outward and away from the different sized fasteners,
  wherein the adjustable adapter module further comprises a guide having a plurality of radially oriented channels configured to guide the plurality of clamps into engagement with the different sized fasteners, wherein the different sized fasteners are receivable within an open central region of the guide so that the plurality of radially oriented channels are in radial alignment with the different sized fasteners in open central region.

18. The torque assembly of claim 17, wherein the at least one lobe is a plurality of lobes, the at least one clamp is a plurality of clamps, and the at least one spring is a plurality of springs, wherein the surface connecting the leading end to the trailing end is curved, and wherein the adjustable adapter module further comprises a guide having a plurality of radially oriented channels configured to guide the plurality of clamps into engagement with the different sized fasteners and a retention assembly configured to retain the adjustable adapter module connected to the wrench.

* * * * *